United States Patent [19]

Appleman et al.

[11] 4,082,226
[45] Apr. 4, 1978

[54] SHUT-OFF NOZZLE

[75] Inventors: Theodore C. Appleman, Mansfield; Wade L. Wacker, Ashland, both of Ohio

[73] Assignee: Eastside Machine & Welding, Inc., Ashland, Ohio

[21] Appl. No.: 714,625

[22] Filed: Aug. 16, 1976

[51] Int. Cl.² .................................................. B29F 1/03
[52] U.S. Cl. ....................................... 239/584; 251/62; 425/564
[58] Field of Search ................. 239/583, 584; 251/62, 251/63.4; 425/245 R, DIG. 224, 562, 564

[56] References Cited

U.S. PATENT DOCUMENTS

| | | | |
|---|---|---|---|
| 1,690,685 | 11/1928 | Karnasch et al. | 239/583 |
| 2,972,776 | 2/1961 | Siegrist | 425/DIG. 224 |
| 3,490,701 | 1/1970 | Malec | 239/584 |
| 3,924,811 | 12/1975 | Lynex et al. | 239/584 X |

FOREIGN PATENT DOCUMENTS 373,257  7/1939  Italy ................................ 239/583

Primary Examiner—Evon C. Blunk
Assistant Examiner—Andres Kashnikow
Attorney, Agent, or Firm—Mack D. Cook, II

[57] ABSTRACT

A shut-off nozzle for the injection molding of fluid plastics. The nozzle includes an axial body component with a bore for transfer of the fluid plastic from the molding machine to the molding cavity through a nozzle head. The nozzle body carries thereon an actuating cylinder mechanism for selective actuation of a core plug and valve assembly. The valve is reciprocated to fully close or fully open a delivery bore in the nozzle head.

7 Claims, 7 Drawing Figures

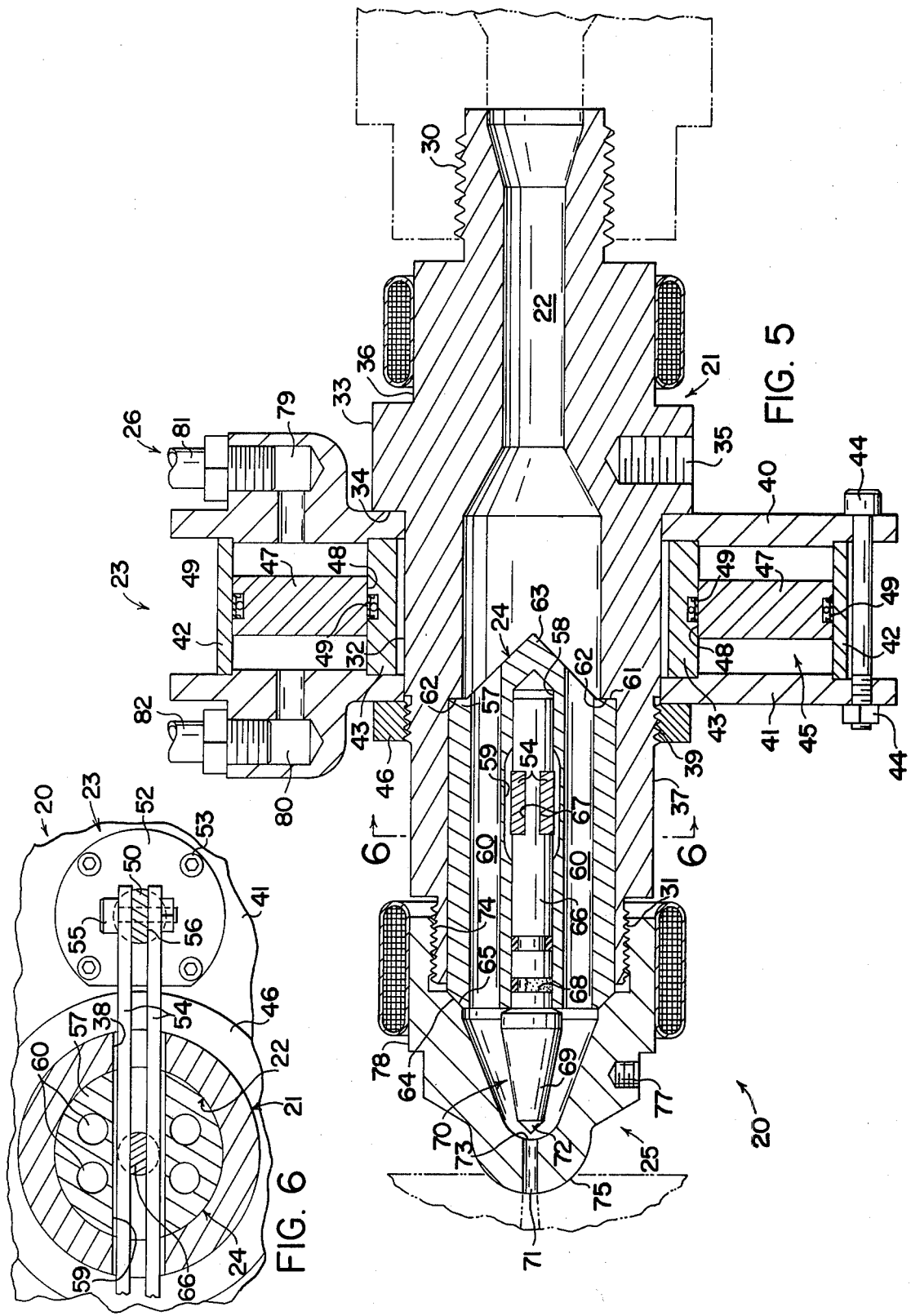

SHUT-OFF NOZZLE

BACKGROUND OF THE INVENTION

The present invention relates to a shut-off nozzle for injection molding of fluid plastics. The improved nozzle is connected to the barrel of an injection molding machine and is in selective communication with the sprue channel or bushing of a molding cavity. The improved nozzle is positively operated to fully open or fully close during transfer of the fluid plastic or plastic melt from the molding machine to the molding cavity.

Shut-off nozzles for injection molding of fluid plastics are not new. U.S. Pat. No. 3,401,426, Sept. 1968, Evans, discloses an injection molding machine having an integrally connected nozzle (N) with an axial plunger (28) relatively reciprocable between compression and decompression strokes and intended to prevent premature drool of plastic between injection shot-cycles. U.S. Pat. No. 3,500,501, March 1970, Johansson, discloses a nozzle shut-off device and acknowledges various forms of prior art devices employed to interrupt the flow of molten material from the nozzle into the mold sprue.

A publication, Plastics Machinery & Equipment Magazine, July 1976, Vol. 5, No. 7, at page 10, reviews several contemporary nozzle designs for injection molding of thermoplastics.

It has now been found that a shut-off nozzle for an injection molding machine need not be complex, may be relatively inexpensive to install, maintain and operate using precision fabricated and engineered components, and will satisfactorily perform with realistically chosen and reasonable operating parameters.

SUMMARY OF THE INVENTION

The object of the invention is to provide an improved shut-off nozzle for injection molding of fluid plastics.

It is a further object of the invention to provide a shut-off nozzle for connection to the barrel of an injection molding machine which will positively operate to fully open or fully close during transfer of the fluid plastic or plastic melt from the molding machine to the molding cavity.

The invention has been conceived with the specific object of improving the operation of injection molding machines by providing a shut-off nozzle which will be relatively inexpensive to install, maintain and operate, and which will satisfactorily perform during plasticizing and delivery of the various types of plastics being molded in the industry.

These and other objects of the invention, and further advantages thereof, will be apparent in view of the description of an embodiment thereof, as set forth below.

In general, a shut-off nozzle for the injection molding of fluid plastics according to the invention has: as the primary axial component, a nozzle body with a varied diameter bore therethrough for transmission of fluid plastic; a cylinder mechanism carried coaxially around the nozzle body and including a cross-link component extending transversely through the body and through the bore; a core plug carrying an axially movable valve positioned coaxially within the outer end of the nozzle bore, the valve being selectively actuated by the cylinder mechanism cross-link component; a nozzle head having an outlet bore for delivery of fluid plastic carried on the outer end of the nozzle body, the outlet bore being selectively opened or closed by the valve; and, pressure fluid components for the selective operation of the cylinder mechanism.

DESCRIPTION OF THE DRAWINGS

FIG. 5 is a full sectional view taken substantially as indicated on line 5—5 of FIG. 4;

FIG. 6 is a fragmentary cross-sectional view taken substantially as indicated on line 6—6 of FIG. 5.

DETAILED DESCRIPTION OF THE INVENTION

Figure 1:
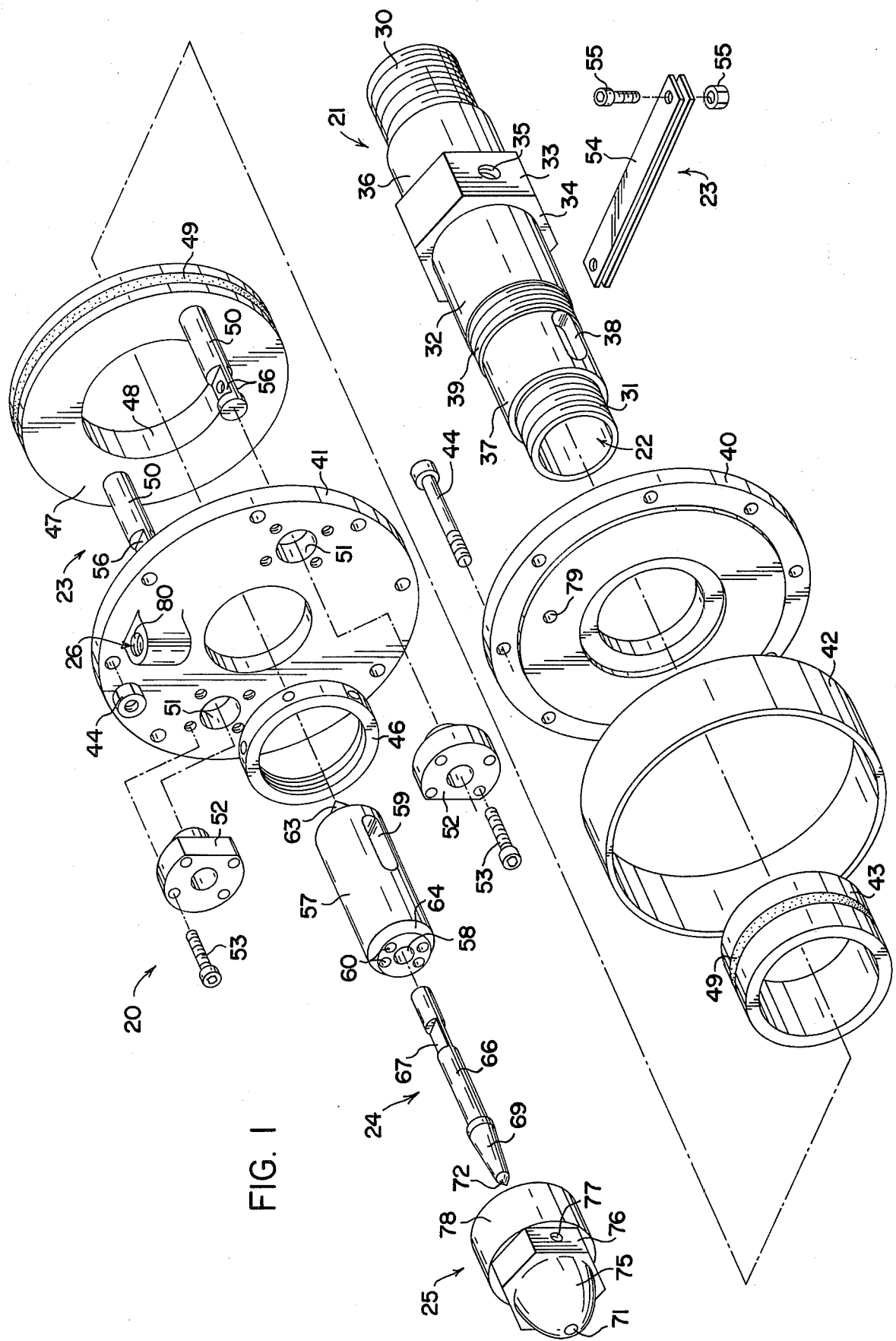
FIG. 1 is a perspective exploded view showing the components of a shut-off nozzle according to the invention.

A shut-off nozzle according to the invention is referred to generally by the numeral 20. The primary axial component of a nozzle 20 is the nozzle body, referred to generally by the numeral 21. The nozzle body 21 has an axially continuous varied diameter bore therethrough, referred to generally by the numeral 22. The nozzle body 21 carries thereon an actuating cylinder mechanism, referred to generally by the numeral 23. The cylinder mechanism 23 selectively actuates a core plug and valve assembly positioned coaxially within the outer end of nozzle bore 22 and referred to generally by the numeral 24. The outer end of the nozzle 21 carries a head or tip for delivery of fluid plastic which is referred to generally by the numeral 25. The pressure fluid components for operation of the cylinder mechanism are referred to generally by the numeral 26.

The nozzle body 21 is an elongated precision fabricated element. The inner end is adapted for secure connection to the barrel of a conventional injection molding machine (shown in chain lines), as by peripheral threads 30. The outer end is adapted for mounting the nozzle head 25, as by peripheral threads 31. The medial portion 32 is preferably cylindrical for coaxial mounting of components of the actuating cylinder mechanism 23, as described in further detail below. Axially inwardly of the medial portion 32, the nozzle body 21 has a flange ring 33 for the application of rotative force to the nozzle 20 during connection or disconnection of the peripheral threads 30 with the molding machine. Preferably, the flange ring 33 may also provide an axially outwardly facing radially directed stop surface 34 for seating the axially inner cap plate component of the cylinder mechanism 23. The flange ring 33 may also have a tapped bore 35 for receiving a conventional sensor (not shown) for monitoring the temperature of the fluid plastic within the nozzle bore 22.

Adjacent the inner end threads 30, the nozzle body 21 has a preferably cylindrical area providing a land 36 for seating a conventional resistance heating element. Adjacent the outer end threads 31, the nozzle body 21 has a preferably cylindrical portion 37 with dual opposed axially elongate slots 38 communicating with the nozzle bore 22. The slot portion 37 has an axial extent or length adequate to define the slots 38 and to accommodate the positioning of the core plug and valve assembly 24 within the nozzle bore 22, as described in further detail below. Between the slot portion 37 and the medial portion 32, the nozzle body 21 preferably has peripheral threads 39 for mounting a locking component of the cylinder mechanism 23.

The cylinder mechanism 23 includes opposed radially directed axially inner and outer cap plates 40 and 41. The axially inner cap plate 40 may be precisely positioned around the nozzle boby portion 32 by seating against the stop surface 34 on the nozzle body ring flange 33. The cap plates 40 and 41 are separated by a radially outer body or ring element 42 and a radially inner bushing or ring element 43. The bushing 43 is fitted coaxially around the medial portion 32 of the nozzle body 21. Mating and interfitting surfaces on the cap plates 40 and 41, the body 42 and the bushing 43 are assembled together using suitable fastening means 44 to provide a pressure fluid chamber indicated generally at 45. The assembled cylinder components (40, 41, 42, 43 and 44) are secured coaxially around the nozzle body 21, as by a rotatable locking ring 46, in mating engagement with the peripheral threads 39.

The fluid pressure chamber 45 houses a piston 47 having an axial opening 48 for movable mounting on the bushing 43. Suitable fluid pressure seals 49 should be provided for sliding engagement with the piston 47. The piston 47 has dual opposed posts 50 projecting outwardly within aligned and pressure sealed bores 51 through the axially outer cap plate 41. As shown, the post bores 51 extend through bushing rings 52 secured to the cap plate 41 by suitable fastening means 53.

The outer end of each post 50 is adapted for attachment to one end of the cross-link component 54 of the cylinder mechanism 23. As shown, the cross-link component 54 comprises dual rectangular actuating bars attached by fastening means 55 within opposed notches 56 on the posts 50 and extending through the nozzle body slots 38 and bore 22.

The core plug 57 of the assembly 24 has a forwardly opening axial bore 58 therein. The medial portion of the core plug 57 has dual opposed axially elongate slots 59 communicating with the axial bore 58. The core plug slots 59 and the aligned nozzle body slots 38 receive therethrough the cylinder mechanism cross-link component 54. Radially around the axial bore 58, a series of by-pass bores 60 transmit fluid plastic from the nozzle bore 22 through the core plug 57 to the nozzle head 25.

The core plug 57 is non-movably confined within the nozzle bore 22. As shown, the axially inner end of the core plug 57 has a radially directed surface 61 intended for fluid plastic sealed mating engagement with a conforming radially directed shoulder or stop surface 62 in the nozzle bore 22. To facilitate flow of fluid plastic into the by-pass bores 60, the core plug surface 61 may have thereon an axially inwardly projecting conical diverter 63. The axially outer end of the core plug 57 may have a radially directed conical shoulder or surface 64 for fluid plastic sealed mating engagement with a conforming radially directed conical surface 65 on the nozzle head 25.

Figure 7:
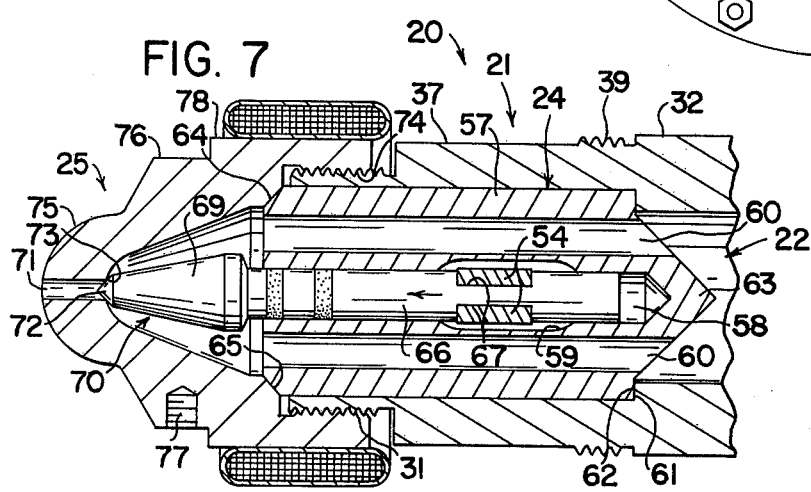
FIG. 7 is a fragmentary sectional view showing the improved shut-off nozzle in a fully closed position.
Figure 4:
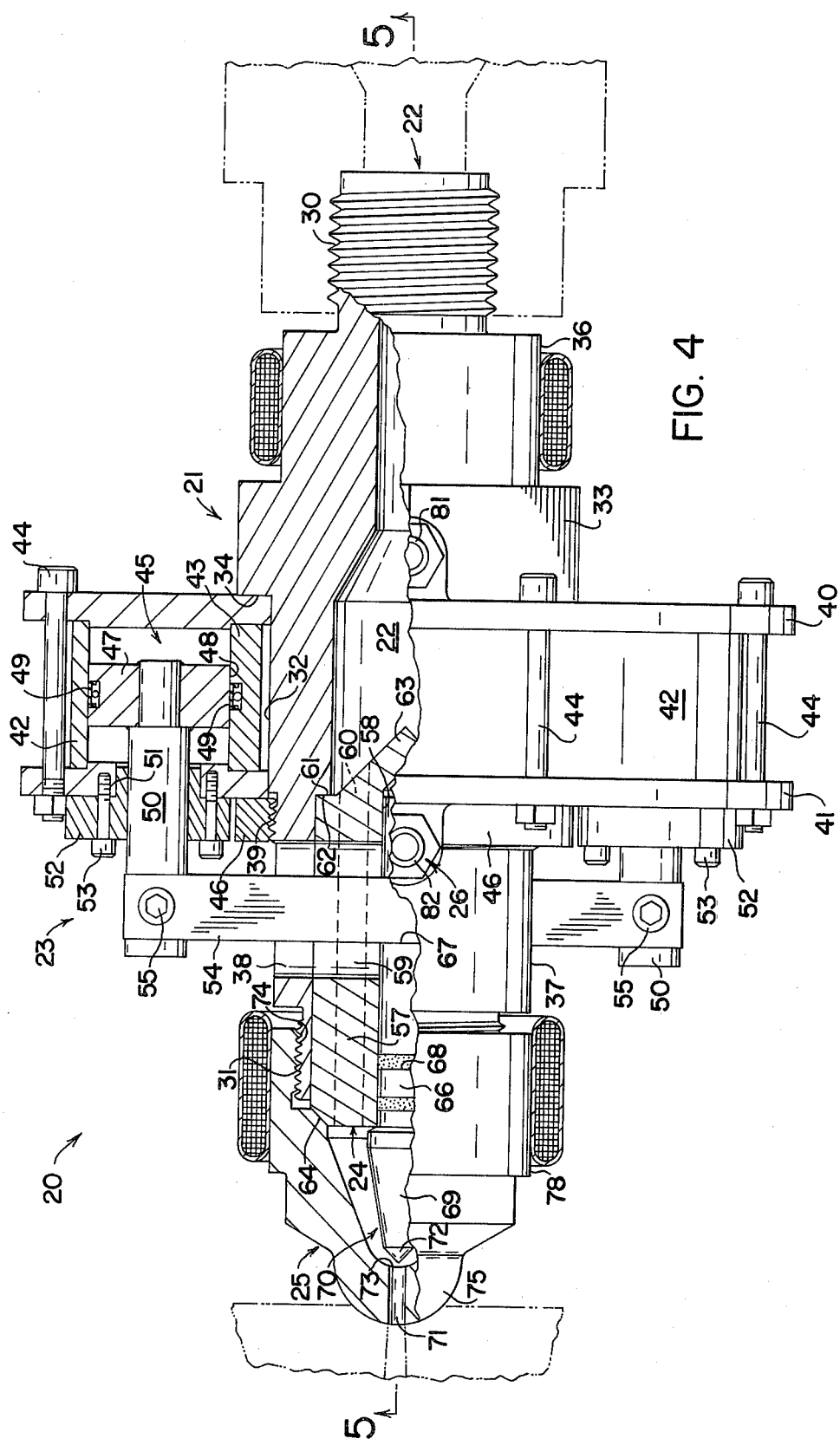
FIG. 4 is an enlarged view in elevation, partly in section, taken substantially as indicated on line 4—4 of FIG. 3.

The valve of the assembly 24 has a stem 66 slidably positioned within the axial bore 58 of the core plug 57. As shown, the valve stem 66 has opposed notches 67 for engagement with the cross-link component or dual actuating bars 54 of the cylinder mechanism 23. The valve stem 66 may also have one or more channels 68 on the surface thereof for receiving fluid plastic and tending to minimize fluid plastic leakage or migration axially inwardly through the core plug bore 58. The valve body 69 carried by the valve stem 66 projects into a fluid plastic chamber indicated generally at 70 communicating with the delivery or outlet bore 71 in the nozzle head 25. As shown, the periphery of the valve body 69 is dimensioned or proportioned in relation to the nozzle chamber 70 so as to hold a predetermined volume of fluid plastic within the nozzle head 25 when the outlet bore 71 is closed (see FIG. 7). Preferably, and also as shown, the tip 72 on the valve body 69 is conical, having an increased taper relative to the valve body per se, so as to assure full seating contact with a circular edge 73 at the axially inner end of the outlet bore 71 and to compensate for attrition or wear of the mating components during multi-operations of the nozzle 20.

In addition to the stop surface 65, the fluid plastic chamber 70, the outlet bore 71, and the circular edge 73, and internal threads 74 for mating engagement with the nozzle body threads 31, the nozzle head 25 will have an external surface 75, dimensioned or proportioned as required for effective transfer of the fluid plastic to the sprue channel or bushing of a molding cavity (shown in chain lines). Axially inwardly of the surface 75, the nozzle head 25 has a flange ring 76 for the application of rotative force to the nozzle head during connection or disconnection with the peripheral threads 31 on the nozzle body 21. The flange ring may also have a tapped bore 77 for receiving a conventional sensor (not shown) for monitoring the temperature of the fluid plastic within the chamber 70. Adjacent the flange ring 76, the axially inner end of the nozzle head 25 has a preferably cylindrical area providing a land 78 for seating a conventional resistance heating element.

Figure 2:
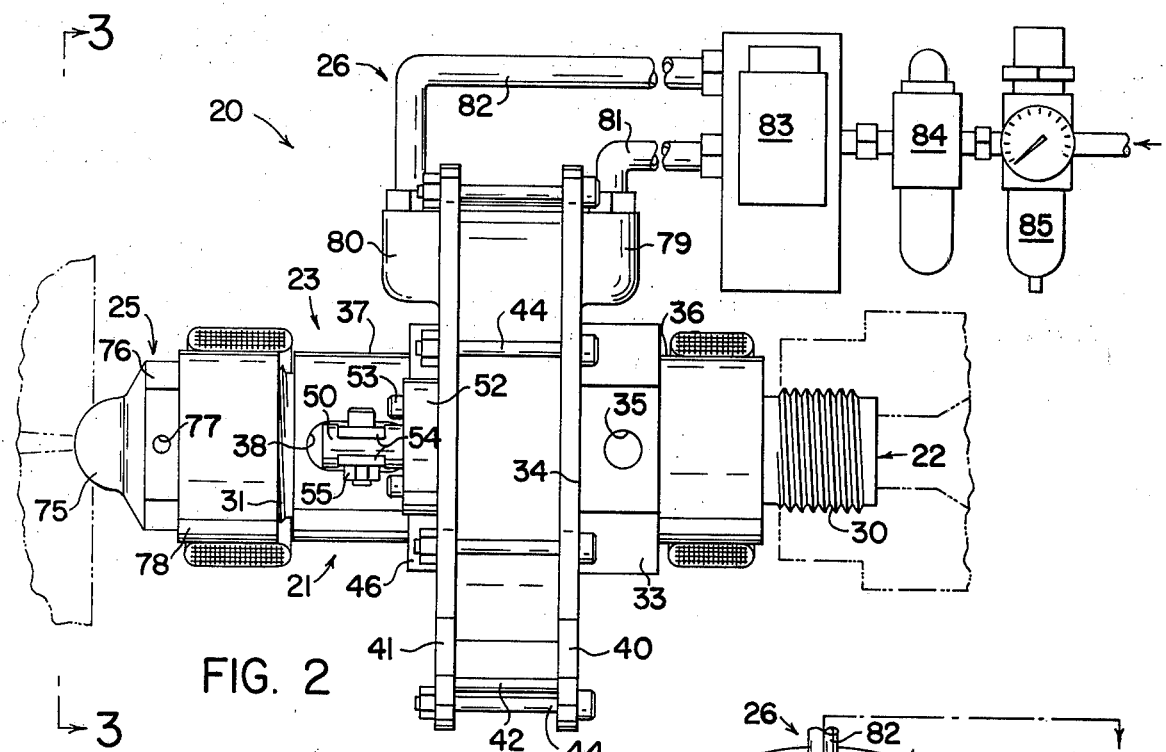
FIG. 2 is a view in elevation showing the improved shut-off nozzle in a position for transfer of the fluid plastic from a molding machine to a molding cavity.
Figure 3:
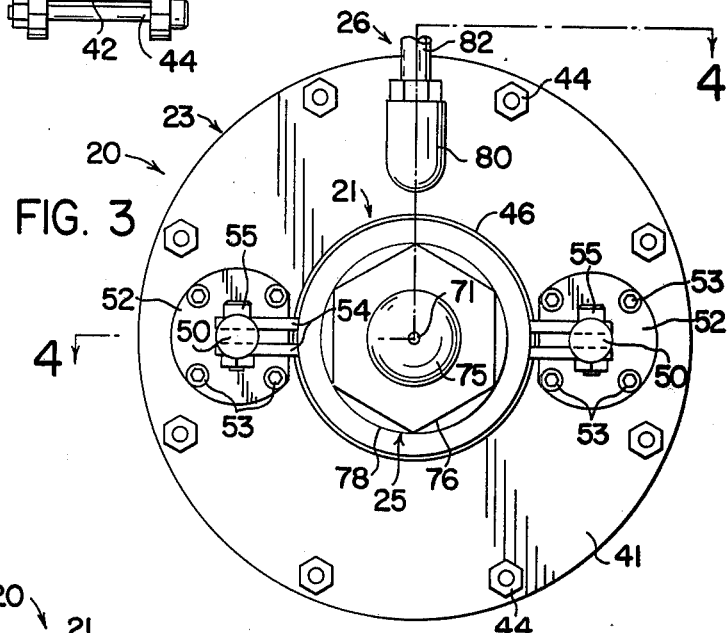
FIG. 3 is a front end view taken substantially as shown on line 3—3 of FIG. 2.

The pressure fluid components 26 include fluid pressure conditions 79 and 80 in the cylinder mechanism cap plates 40 and 41. Additional components 26 which may be used with a nozzle 20 include flexible supply and exhaust conduits 81 and 82 having suitable end fittings for connection to the cap plate conduits 79 and 80. Referring to FIG. 2, the flexible conduits 81 and 82 extend from the cylinder mechanism 23 to a conventional air valve 83. The air valve 83 may be supplied with relatively low air pressure (e.g., 60 psi) through a conventional lubricator 84 and filter-regulator 85. The operation of the nozzle 20 is easily and efficiently controlled in sequence with the shot-cycle of the molding machine by the air valve 83.

It will be understood that changes and modifications could be made to the nozzle 20 without departing from the inventive subject matter as disclosed herein. For example, the assembly of cylinder mechanism components 40, 41, 42, 43 and 44, fairly described as "drum shaped", could have a shape or form other than circular. Or, the nozzle body portions 32, 36 and 37 could have a form or shape other than cylindrical. Another apparent modification could be to use a single cross-link component 54, supported by the posts 50 and extending through a slot in the valve stem 66. Also, the external surface 75 on the nozzle head 25 could be axially extended so that the nozzle 20 could communicate directly with the parting line of the molding cavity providing for "sprueless injection molding". Finally, although intended for use with compressed air as the pressure fluid, the pressure fluid components 26 could be adapted for the use of hydraulic fluid or hot water as the pressure medium.

CONCLUSION

The shut-off nozzle 20 may be used as original equipment or to retrofit conventional and known injection molding machines. The operating efficiency of the relatively large surface area of the piston 47 within the fluid pressure chamber 45, and the requirement for only a relatively short stroke or axial movement of the valve body 69, via the valve stem 66, cross-link components 54 and posts 50, will permit the use of a readily available low air pressure. Disassembly of the nozzle 20 for maintenance or repair, or removal and change of the nozzle head 25, can be performed in a minimum of time. The components subject to wear or attrition, the valve body 69 and the pressure seals 49, should not be expensive to replace.

What is claimed is:

1. A shut-off nozzle (20) for the injection molding of fluid plastics, comprising:
    a nozzle body (21) with a bore (22) therethrough for the transmission of fluid plastic, a cylinder mechanism (23) carried by said nozzle body, a core plug and valve assembly (24) positioned within the outer end of nozzle bore head (25) having an outlet bore for delivery of said fluid plastic carried on the outer end of said nozzle body and pressure fluid components (26) for the selective operation of said cylinder mechanism;
    said nozzle body (21) having an inner end adapted for connection to the barrel of an injection molding machine, a medial portion for the coaxial mounting of components of said cylinder mechanism and a portion axially inwardly of said nozzle head with opposed axially elongate slots (38) communicating with said nozzle bore;
    said cylinder mechanism (23) including opposed radially directed axially inner and outer cap plates (40 and 41) separated by a radially outer body element (42) and fastened together coaxially around said nozzle body medial portion to provide a pressure fluid chamber (45), each said cap plate having a conduit (79 or 80) therethrough for the supply or exhaust of pressure fluid to or from said pressure fluid chamber, and an axially movable piston (47) within said pressure fluid chamber, said piston having dual opposed posts (50) projecting outwardly through said axially outer cap plate (41) and carrying a cross-link component (54) extending transversely through said nozzle body slots (38) and said bore (22);
    said core plug and valve assembly (24) having a forwardly opening axial bore (58) therein and opposed axially elongate slots (59) communicating with said axial bore and receiving therethrough said cylinder mechanism cross-link component (54), a bypass bore (60) radially of the said axial bore to transmit fluid plastic from said nozzle bore (22) to said nozzle head (25), a valve stem (66) slidably positioned within said axial bore and actuated by said cylinder mechanism cross-link component, and a valve body (69) carried by said valve stem for selectively opening or closing said outlet bore in said nozzle head.

2. A shut-off nozzle according to claim 1 wherein a core plug for said core plug and valve assembly (24) is a discrete element (57) having radially directed axially inner and outer end surfaces (61 and 64) for mating engagement with conforming surfaces in said nozzle bore (22) and on said nozzle head (25), whereby said core plug is non-movably confined within said nozzle bore.

3. A shut-off nozzle according to claim 1 wherein said medial portion (32) of said nozzle body (21) has a flange ring (33) for applying rotative force to said nozzle and for providing an axially outwardly facing radially directed stop surface (34) for seating said axially inner cap plate (40) of said cylinder mechanism.

4. A shut-off nozzle according to claim 1 wherein said pressure fluid components (26) include flexible supply and exhaust conduits (81 and 82) connected to said cylinder mechanism cap plate conduits and adapted to extend therefrom to an air valve (83) supplied with relatively low air pressure.

5. A shut-off nozzle according to claim 1 wherein said valve stem (66) of said core plug and valve assembly (24) has a channel (68) thereon for receiving fluid plastic and tending to minimize fluid plastic leakage axially inwardly through said axial bore (58).

6. A shut-off nozzle according to claim 1 wherein said valve body (69) of said core plug and valve assembly (24) has a conical tip (72) having an increased taper relative to said valve body.

7. A shut-off nozzle according to claim 6 wherein said nozzle head (25) has a fluid plastic chamber (70) communicating said outlet bore (71) and a circular edge (73) at the axially inner end of said outlet bore, and said conical tip (72) on said valve body is in seating contact with said circular edge when said outlet bore is closed.

* * * * *

UNITED STATES PATENT OFFICE
CERTIFICATE OF CORRECTION

Patent No. 4,082,226            Dated April 4, 1978

Inventor(s) Theodore C. Appleman and Wade L. Wacker

It is certified that error appears in the above-identified patent and that said Letters Patent are hereby corrected as shown below:

Col. 4, line 36, "conditions 79 and 80" should read -- conduits 79 and 80 --;

Col. 5, line 25, "end of nozzle bore head (25)" should read -- end of said nozzle bore, a nozzle head (25) --;

Col. 6, line 47, "said outlet bore (71)" should read -- with said outlet bore (71) --.

Signed and Sealed this

Twenty-second Day of August 1978

[SEAL]

Attest:

RUTH C. MASON
*Attesting Officer*

DONALD W. BANNER
*Commissioner of Patents and Trademarks*